United States Patent [19]

Dube et al.

[11] Patent Number: 4,467,658
[45] Date of Patent: Aug. 28, 1984

[54] HYDRO RESISTANCE ANEMOMETER

[75] Inventors: C. Michael Dube, Redondo Beach; George L. Donohue, San Pedro; Ronald A. Blackwelder, Torrance, all of Calif.

[73] Assignee: Dynamics Technology, Inc., Torrance, Calif.

[21] Appl. No.: 356,518

[22] Filed: Mar. 9, 1982

[51] Int. Cl.³ .............................................. G01F 1/64
[52] U.S. Cl. .................... 73/861.08; 73/204; 324/65 P; 324/446; 324/441
[58] Field of Search ............................ 73/861.08, 204; 324/441, 446, 65 P

[56] References Cited

U.S. PATENT DOCUMENTS

| 3,148,541 | 9/1964 | Higgins | 73/861.08 |
| 3,352,154 | 11/1967 | Djorup | 73/189 |
| 4,016,758 | 4/1977 | Taylor | 73/204 |
| 4,227,151 | 10/1980 | Ellis et al. | 324/441 X |

FOREIGN PATENT DOCUMENTS

| 1054357 | 1/1967 | United Kingdom | 324/446 |
| 2056682 | 3/1981 | United Kingdom | 324/446 |

OTHER PUBLICATIONS

*Air–Sea Interaction, Instruments and Methods*, "Hot/-Cold Sensors of Oceanic Microstructure," Ch. 18, Gibson et al., pp. 353–362 and 367, Plenum Press, 1980.

Primary Examiner—Herbert Goldstein
Assistant Examiner—Brian R. Tumm
Attorney, Agent, or Firm—Charles H. Thomas

[57] ABSTRACT

A sensor for a hydro resistance anemometer is designed for immersion in a flowing fluid to provide flow velocity information. The sensor is of a cylindrical configuration with a hemispherical nose. A driving electrode extends axially along the sensor and is exposed to the flowing fluid only at the center of the hemispherical surface of the sensor nose. A reference electrode of annular cylindrical configuration is disposed coaxially about the driving electrode and separated therefrom by a dielectric insulating material. The power dissipated through the sensor is typically on the order of only ten milliwatts.

1 Claim, 10 Drawing Figures

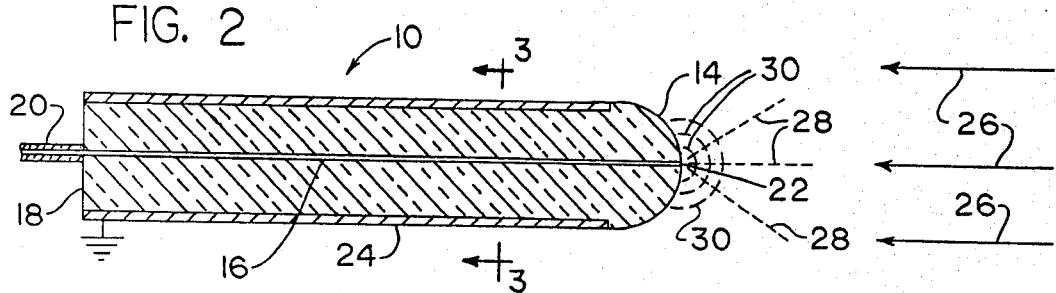
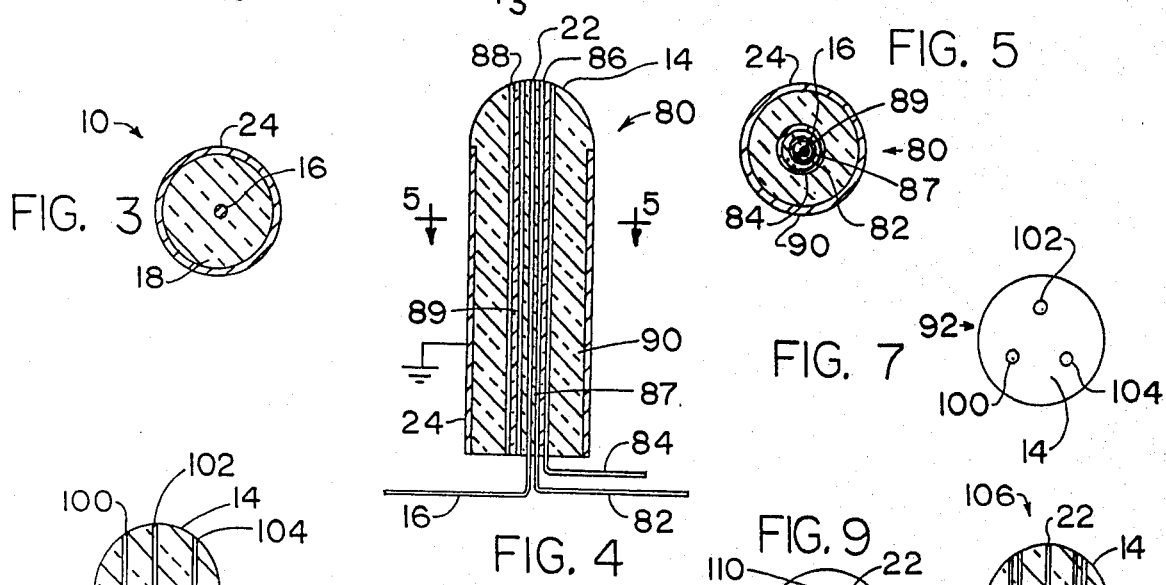
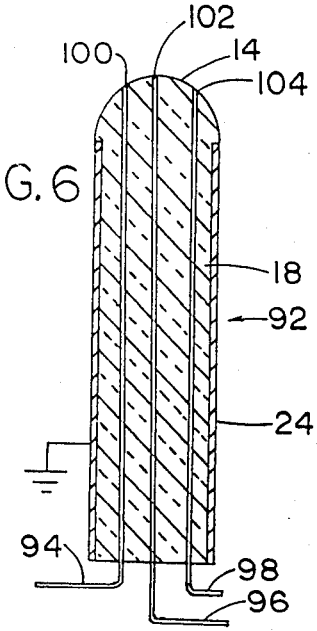
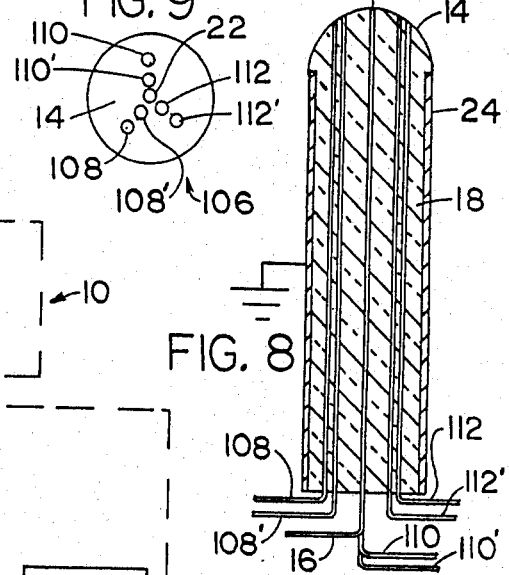
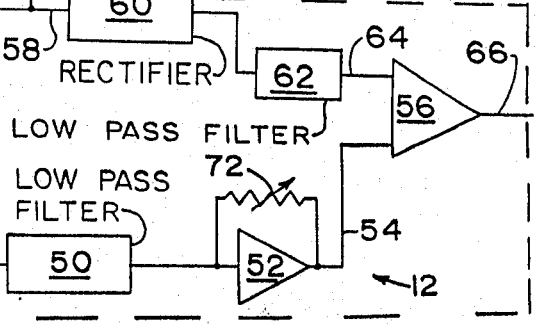
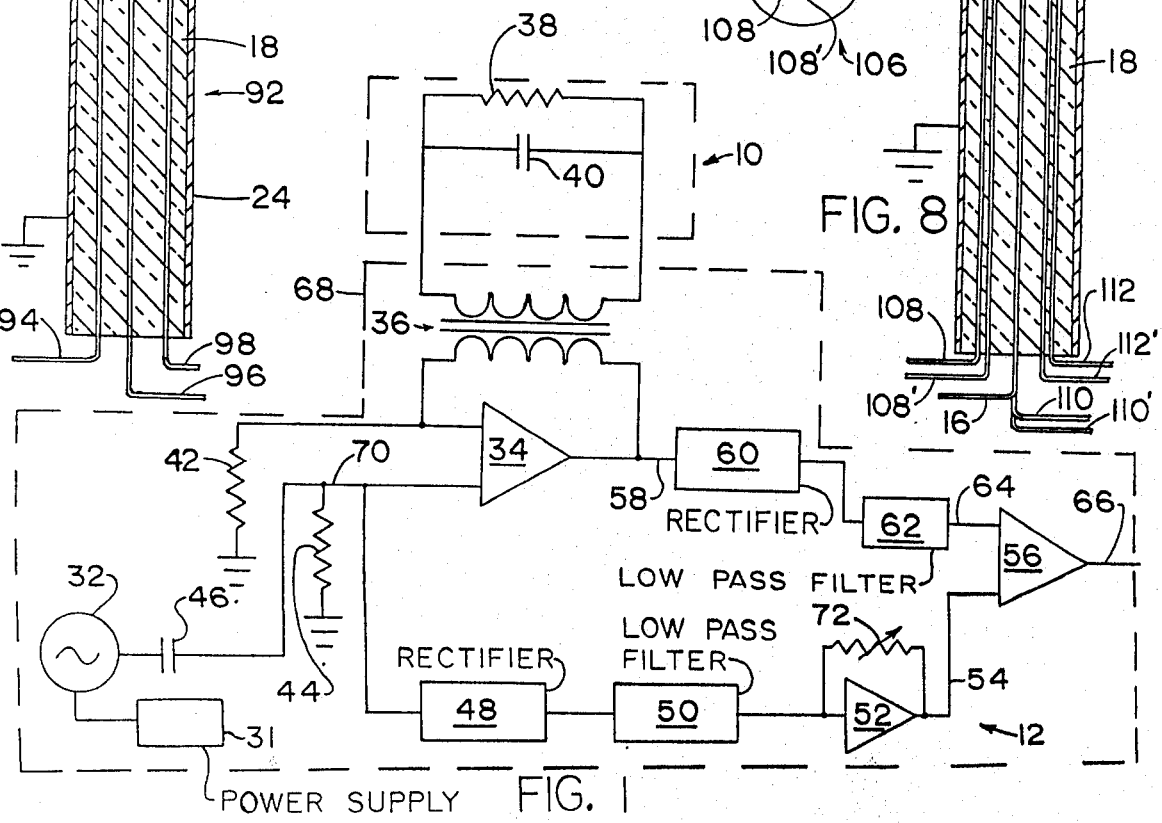

HYDRO RESISTANCE ANEMOMETER

BACKGROUND OF THE INVENTION

1. Field of the Invention

The present invention relates to a hydro resistance anemometer for measuring velocity in a flowing fluid.

2. Description of the Prior Art

A variety of different types of electrically operated anemometers have been employed to measure fluid flow velocity. One type of electrical anemometer is a "hot wire" or "hot film" anemometer. In such an instrument a sensor is immersed in a flowing fluid in thermal contact with the fluid. The sensor contains an electrical resistance or thermistor element. A current is passed through the sensor, thereby creating heat due to resistance through the electrical element. The heat generated is partially dissipated by thermal conductance to the fluid flowing past the sensor. The rate of thermal transfer is dependent both upon the thermal conductivity and velocity of fluid flowing past the sensor. Since thermal conductivity in many flowing fluids remains essentially constant, changes in the resistance of the electrical element in a "hot wire" or "hot film" anemometer are caused mainly be changes in the velocity of flow of the fluid past the sensor.

In a fluid which is cooler than the electrical resistance element in the sensor, a decrease in resistance in the electrical element is indicative of a greater rate of thermal transfer to the flowing fluid, which in turn is indicative of a greater fluid flow velocity. Conversely, an increase in electrical resistance is indicative of a reduced thermal transfer to the fluid caused by a reduced fluid flow velocity. In "hot wire" and "hot film" anemometers no electrical current is passed directly through the fluid. Rather, the current is passed through a resistance element in the sensor which in turn transfers heat to the fluid by thermal conduction and/or convection. The resistance element in the sensor is applied as one input to an instrument for indicating fluid flow velocity. For example, the electrical resistance element may be one leg of a Wheatstone bridge.

Because there is a relatively great current flow through the electrically conductive resistance element in a "hot wire" anemometer, such instruments exhibit a relatively large power consumption. "Hot wire" anemometers are therefore unsuitable for use in applications where the fluid flow location is remote or unattended. Under each conditions a self-contained battery power pack for the sensor is necessary. Anemometers for oceanographic studies and surveys must often have self contained power supplies, as must anemometers employed in other remote and unattended locations.

An alternative type of electrical anemometer does not heat an electrical resistance element, but rather employs electrodes which are exposed to a flowing fluid in spaced proximity from each other. One such fluid flow velocity sensor is described in U.S. Pat. No. 3,148,541. The flow measuring device described in this patent has a bridge circuit, one leg of which includes a resistance probe. The probe is shaped with a conical tip to provide minimum hydrodynamic disturbance and a relatively high voltage signal is required across the bridge. The power requirement is approximately 10 watts. The probe employs a pair of electrodes, spaced approximately one millimeter apart, across which an ac voltage is applied. An electrical current is conducted through the fluid. The magnitude of this current creates a localized heating effect in the fluid. To the extent that the heated fluid is swept away by fluid flow, the resistance to the current through the fluid is varied. Accordingly, a high flow rate will rapidly dissipate the heated fluid and thereby lower resistance in current flow through the fluid. Conversely, a low flow rate will not rapidly dissipate fluid in the vicinity of the probe electrodes, so that the increased localized temperature in the fluid decreases resistance, for example, in sea water, to current flow through the fluid.

SUMMARY OF THE INVENTION

The present invention is a sensor for a hydro resistance anemometer. Unlike the sensor of U.S. Pat. No. 3,148,541, the sensor of the present invention has a blunt end in which a driving electrode is spaced from an electrically conductive reference electrode. While prior electrical anemometer designs have attempted to minimize turbulence by disrupting fluid flow as little as possible, the present invention operates upon a different principle. By using a blunt sensor nose, preferably of hemispherical design, probe sensitivity is greatly increased. This increase in sensitivity is achieved with a marked decrease in power requirement. Specifically, and as contrasted with the power requirement of the device of U.S. Pat. No. 3,148,541, the sensor of the present invention exhibits a power consumption of only about 10 milliwatts. This improvement distinguishes the present invention from prior hydro resistance anemometers in that it is not a laboratory curiosity, but is a practical instrument. The probe of the present invention, including all of the associated processing electronics, consumes less than about one watt of power for implementation on a typical ocean instrument package. This sensor power consumption is only about one percent of the power consumption of prior devices.

An additional feature of the present invention is that the electrode spacing in the probe need not be made extremely small, such as the one millimeter spacing suggested in prior systems. In the present invention the outer ground sleeve may be located arbitrarily distant from the driving electrode.

Because the reference electrode is relatively distant from the driving electrode, the electrodes respond as if there were an infinite distributed conducting fluid, whose conductivity is equal to that of the fluid within a few drive electrode diameters of the drive electrode. This response is achieved when the reference electrode is located from the driving electrode a distance of more than a few times the thickness or diameter of the driving electrode.

Because the sensor of the present invention has a blunt end, the heated fluid in the vicinity of the driving electrode is not so rapidly swept away. This increases the sensitivity and reduces the power requirement in the instrument in which the sensor is employed. With a sensor configuration in which the blunt sensor end is of a hemispherical shape bounded by a reference electrode and having an exposed tip of the driving electrode located at the center of the hemispherical surface, the time residence of heated fluid in the vicinity of the driving electrode at the center of the hemispherical surface, or stagnation point, is increased.

The invention may be described with greater clarity and particularity by reference to the accompanying drawings.

DESCRIPTION OF THE DRAWINGS

FIG. 1 is an electrical diagram of a hydro resistance anemometer employing a sensor of the improved design according to the invention.

FIG. 2 is a lengthwise sectional view of a sensor according to the invention.

FIG. 3 is a sectional view taken along the lines 3—3 of FIG. 2.

FIG. 4 illustrates an alternative embodiment to the sensor configuration of FIG. 2.

FIG. 5 is a cross sectional view taken along the lines 5—5 of FIG. 4.

FIG. 6 illustrates another alternative embodiment of the sensor of the invention.

FIG. 7 is an end view of the blunt end of the sensor of FIG. 6.

FIG. 8 illustrates yet another alternative embodiment of the sensor of the invention.

FIG. 9 is an end view of the blunt end of the sensor of FIG. 8.

DESCRIPTION OF THE EMBODIMENTS

Figure 10:
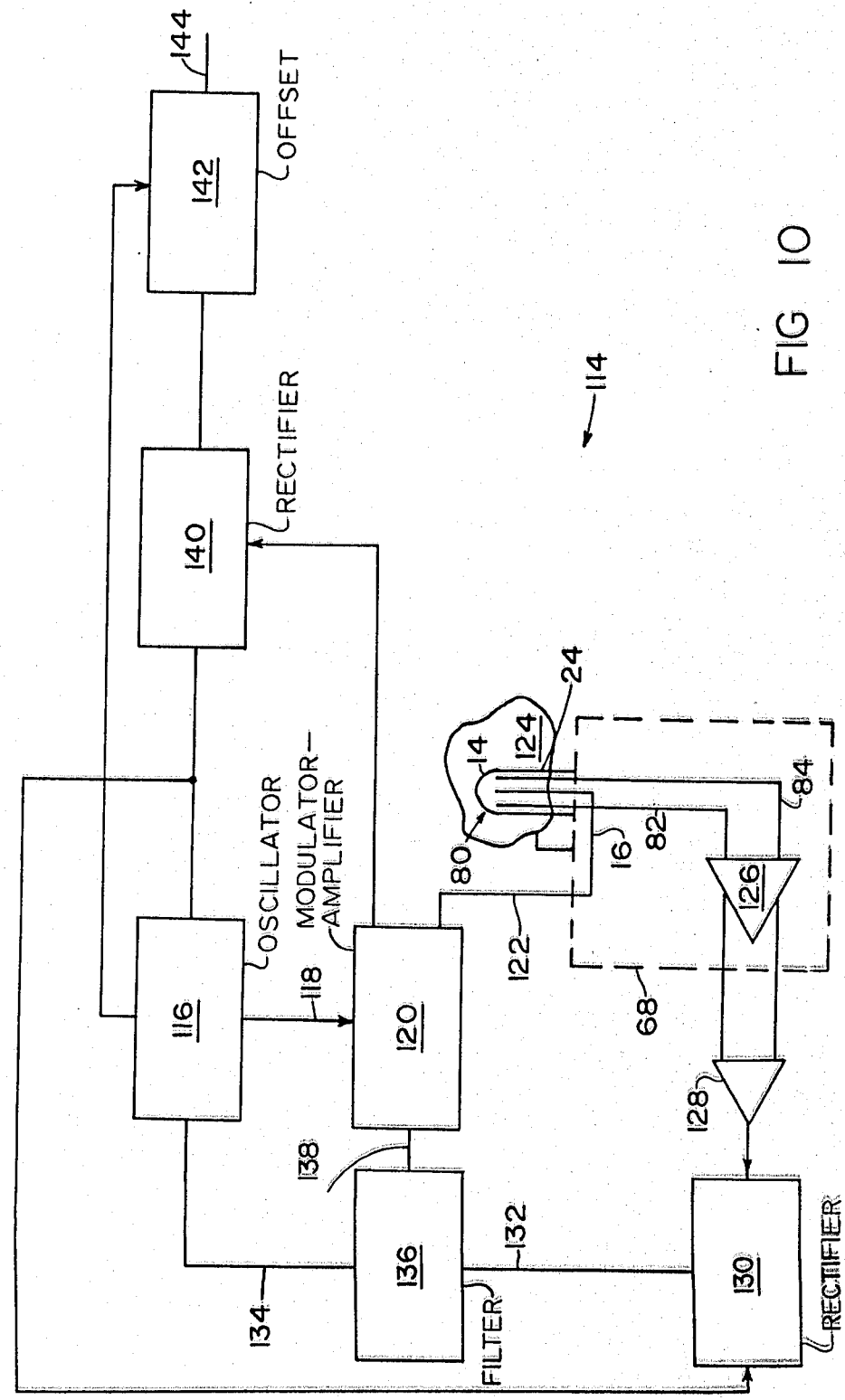
FIG. 10 illustrates another version of a hydro resistance anomometer according to the invention, alternative to that of FIG. 1.

FIG. 2 illustrates a sensor 10 for use in the hydro resistance anemometer 12 depicted in FIG. 1. The sensor 10 has a blunt nosed end 14 with a surface configured in a hemispherical shape. The sensor 10 has a driving electrode 16 which is a wire axially disposed within an encapsulating dielectric insulator 18. The dielectric insulator 18, and the insulating umbilical, flexible, plastic coating 20, laterally envelop the wire forming the electrode 16 except at the driving electrode tip, indicated at 22. The electrode tip 22 is exposed to the fluid in which the sensor 10 is immersed at the blunt sensor end 14. An electrically conductive reference electrode 24, in the form of a tubular sheath surrounds the insulating dielectric 18 and encircles the driving electrode 16. The reference sheath 24 encircles the driving electrode tip 22 at a uniformly spaced distance therefrom.

In the embodiment of FIG. 2, the driving electrode 16 is formed of a 0.005" diameter platinum wire. The driving electrode wire 16 is embedded and encapsulated in the dielectric insulator 18. The dielectric insulator 18 may be formed of epoxy resin, for example a RF3000 resin and RF14 hardener manufactured by Resin Formulators, Inc. The electrically conductive reference sheath 24 may, for example, be a 0.6 centimeter diameter stainless steel tube. The end 14 of the sensor 10 is machined to have a hemispherical surface as illustrated in FIG. 2. This blunt nose or end will produce current flux lines which are different from those of sharp, pointed probes. This alters the shape of the sensing volume of fluid.

The direction of fluid flow in FIG. 2 is indicated by the flow directional lines 26. As previously noted, the conductivity of many fluids, for example a saline solution, is a well known function of salinity and temperature. With a voltage potential imposed between the driving electrode 16 and the reference sheath 24, a small electric current is conducted through the fluid. The electrical current between the driving electrode 16 and the reference sheath 24 at the driving electrode tip 22 exhibits current flux lines emanating radially from the tip 22. These lines are indicated at 28 in FIG. 2. The current also produces an electrical field, the strength of which decreases with distance from the driving electrode tip 22. The field lines are indicated at 30 in FIG. 2. Because there is a much higher current density near the tip 22 of the driving electrode 16 utilizing the sensor configuration depicted in FIG. 2, there is a much greater localized heating of the fluid near the driving electrode tip 22. As a result, there is a corresponding decrease in the resistance exhibited by the fluid to an electric current between the driving electrode 16 and the reference sheath 24. This resistance increases as the radius of the driving electrode wire 16 decreases.

When the sensor 10 is immersed in a moving fluid, the heated fluid near the driving electrode tip 22 is continuously swept downstream. This has the dual effect of altering the current flux lines 28 from a zero flow condition and also provides a continuous source of cooler fluid with decreased conductivity. At a fixed power level, a low flow speed of fluid velocity allows a greater heating of the fluid in the vicinity of the sensor end 14. This causes the sensor 10 to exhibit relatively high conductivity and low resistance.

The amount of fluid heating is inversely proportional to the fluid velocity, so the resistance of the sensor 10 is inversely proportional to fluid velocity. At higher speeds, the more rapid supply of cooler fluid causes a lower conductivity and higher resistance. Conversely, if the speed of fluid velocity is fixed and if the conductivity of the fluid is increased by varying the temperature, salinity, power dissipation or other parameters of fluid mechanics, the resistance of the sensor 10 decreases. By supplying a constant amount of heating, the varying resistance in the sensor 10 is a unique function of the flow velocity in a fluid having constant ambient conductivity.

The hydro resistance anomometer 12 of FIG. 1, in addition to the sensor 10, includes an alternating current signal source. The alternating current signal source includes a direct current power supply 31, an oscillator 32, a driving amplifier 34, and an inductive coupling 36. Together these circuit elements alternatingly polarize the driving electrode tip 22 relative to the reference sheath 24. The output of the driving amplifier 34 carries an alternating current signal modified by the effective resistance of the sensor 10 which is created between the driving electrode tip 22 and the reference sheath 24. This effective resistance is indicated at 38 in FIG. 1. There is also an effective capacitance 40 created, but the effective capacitance 40, which contributes only slightly to sensor impedance, is unimportant to operation of the invention.

One input to the driving amplifier 34 is grounded through a resistor 42, while the other input is also grounded through a resistor 44. A dc blocking capacitor 46 is interposed between the oscillator 32 and the driving amplifier 34.

The oscillator 32 is also coupled to a reference signal input circuit formed by a rectifier 48, a low pass filter 50, and a balancing amplifier 52. Together these circuit elements provide one input on line 54 to a summing or comparison amplifier 56. An input from the sensor 10 is provided on the output line 58 from the driving amplifier 34 through a rectifier 60 and a low pass filter 62 to the other input line 64 to the summing amplifier 56. An indicator can be coupled to the output line 66 from the summing amplifier 56 to register the effective resistance 38 through the fluid between the exposed driving electrode tip 22 and the reference sheath 24. The magnitude of the signal on line 66 is indicative of the velocity of the flowing fluid.

In the hydro resistance anemometer 12 depicted in FIG. 1, the signal on line 66 at the output of the summing amplifier 56 varies as a function of velocity of fluid flow past the hemispherical surface of the sensor end 14 depicted in FIG. 2.

The only electrical components of the hydro resistance anemometer 12 exposed to the flowing fluid are the tip 22 of the driving electrode 16 and the reference electrode sheath 24. All of the other electrical components of the hydro resistance anemometer 12 are located within a metal water-tight housing 68. The oscillator 32 includes a direct current battery power supply which operates through a conventional timing chip to produce an alternating current carrier signal with sufficient power to provide the required heating at the blunt end 14 of the sensor 10. A direct current battery power supply cannot be connected directly to these sensor electrodes since a direct current would electrolize the fluid. While a conventional ac bridge circuit could be adapted for use with the hydro resistor anemometer of the invention, a preferred arrangement is illustrated in FIG. 1. In this arrangement the sensor 10 is employed as a feedback element of the operational amplifier 34. The signal applied on line 70 from the oscillator 32 to the operational amplifier 34 and also to the rectifier 48 is a stable reference sine wave. The output signal of the operational amplifier 34, on the other hand is a sine wave modified by the inductive feedback of the sensor 10 applied through the inductive coupling 36.

The ac reference signal from line 70 is rectified to one polarity by a rectifier 48, while the signal on line 58 is rectified to an opposite polarity by the rectifier 60. The signal from rectifier 48 is directed to a one hertz low pass filter 50 which produces a stable, reference dc signal input to the balancing amplifier 52. The level of this dc signal at the output of the balancing amplifier 52 can be adjusted by the wiper 72 in the feedback circuit across the amplifier 52.

The output of the rectifier 60 is directed to a 500 hertz low pass filter 62 which removes the carrier component leaving only a fluctuating dc voltage level on line 64. The signals from lines 54 and 64 are directed to the summing amplifier 56, where an output signal on line 66 is derived. The input signal on line 64 contains a direct current component from the oscillator 32 plus a fluctuating direct current component due to the variation of the sensor resistance 38. The signal on line 54 is a direct current component of opposite polarity from the oscillator 32. The summing amplifier 56 isolates the direct current component attributable to the velocity of fluid flow past the sensor 10.

Several different embodiments of sensor configurations are depicted in FIGS. 2 through 8. All of these embodiments employ a sensor which has a blunt end or nose at which localized heating of the fluid past the sensor occurs. In all of the preferred embodiments illustrated the end of the sensor is formed by an electrical insulator that has a hemispherical portion. With this configuration the hydro resistance anemometer sensor can be operated at a nominal power drain on the battery of no greater than about 10 milliwatts. Also, the use of such a sensor produces a hydro resistance anemometer which is twice as sensitive to speed changes as a conventional "hot film" anemometer operated in a liquid.

The sensor 80 depicted in FIGS. 4 and 5 represents a modification of the sensor design according to the invention. With the sensor 10 long term drift of the output signal through the inductive coupling 36 may be experienced due to changes in the impedance of the driving electrode tip 22. This variation in tip impedance is caused by electrochemical corrosive reactions which alter the effective electrode surface area and its chemical composition. To alleviate this problem, a center driving electrode 16 and a reference electrode 24 encircling the driving electrode 16 are employed as in the sensor 10. However, another pair of concentric, annular passive sensing electrodes 82 and 84 are encapsulated in the dielectric and have exposed edges, 86 and 88 respectively, at the blunt hemispherical sensor end 14 arranged coaxially about the exposed tip 22 of the driving electrode 16. Although the electrodes 82 and 84 enter the structure of the sensor 80 as wires, they are physically configured as concentric, annular tubes within the structure of the sensor 80. The electrode 82 has an annular cross section with the driving electrode wire 16 at its center, as depicted in FIG. 5. The electrode 82 is separated from the electrode wire 16 by a dielectic layer 87. Similarly, an annular dielectric layer 89 separates the annular passive electrodes 82 and 84, while an outer layer 90 of dielectric material separates the outer passive sensing electrode 84 from the reference electrode sheath 24.

The driving electrode 16, as previously noted, is a narrow, cylindrical wire. The exposed edges 86 and 88 of the passive electrodes 82 and 84 are machined to form annular rings or bands on the hemispherical surface of the end 14 of the sensor 80. The exposed edges 86 and 88 are both located quite close to the central axial driving electrode 16. Preferably, both of the electrodes 86 and 88 are located a distance of no greater than 5 driving electrode radii from the exposed driving electrode tip 22.

The passive sensing electrodes 82 and 84 are both of high impedance, preferably about 10 megaohms. Because of this high impedance negligible current flows between the exposed edges 86 and 88 through the fluid in which the sensor 80 is immersed. As a consequence, there are minimal electro chemical reactions on the passive sensing electrodes 82 and 84. The current field, therefore, is set up between the driving electrodes 16 and the reference electrode sheath 24. This current field alters the resistance between the passive electrodes 82 and 84 because the edges 86 and 88 thereof are located within the current field. Accordingly, changes in resistance between the passive sensing electrodes 82 and 84 will not be subject to changes in electrode tip impedance.

Another embodiment of the sensor of the invention permits vector measurements of fluid velocity at the sensor tip by employing multiple electrodes spaced around the blunt nose 14 of the sensor 92, depicted in FIGS. 6 and 7. The sensor 92 employs several electrode wires 94, 96 and 98, all of which are encapsulated in the dielectric 18. The electrodes 94, 96 and 98 all have exposed tips 100, 102 and 104, respectively, uniformly located about the hemispherical surface of the blunt sensor end 14. The exposed surfaces 100, 102 and 104 of the electrodes 94, 96 and 98 are all off of the center line of the sensor 92.

As the velocity vector at the sensor 92 changes direction, the stagnation point on the hemispherical surface of the blunt end 14 will also change its location so that the sensor surface at the stagnation point is normal to the velocity vector. The sensor signals are much more sensitive when the electrodes are located near a stagnation point. By calibrating the individual electrode responses to an axial flow with respect to the sensor 92, and to varying degrees of off axis velocities, one may ascertain the local velocity at each electrode surface 100, 102 and 104 from simultaneous measurements of the individual electrodes 94, 96 and 98.

A variation of this sensor configuration is depicted in the embodiment of FIGS. 8 and 9. The sensor 106 has a blunt sensor end 14 with a hemispherical surface bounded by the reference electrode 24. The exposed tip 22 of the driving electrode 16 is located at the center of the hemispherical surface. Three pairs of passive sensor electrodes 108, 108', 110, 110' and 112 and 112', extend parallel to the driving electrode 16 and are spaced equidistantly therefrom. The passive sensor electrodes 108, 108', 110, 110' and 112, 112' all have exposed surfaces, as depicted in FIG. 9, located uniformly about the hemispherical surface 14 and spaced equidistant from the exposed tip 22 of the driving electrode 16.

The driving electrode 16 heats a small volume of fluid at the tip 22. As the fluid flow changes direction, heated fluid is swept preferentially across different of the passive sensor electrode pairs. This causes a greater induced conductivity change at those electrodes. Again, with proper calibration, the local vector velocity at the exposed surface of each of the passive electrode pairs may be ascertained.

The hydro resistance anomometer 12 of FIG. 1 supplies a constant current to the driving amplifier 34 and the system senses the voltage differential between the driving electrode 16 and the reference electrode 24. An alternative hydro resistance anemometer is depicted in FIG. 10. The hydro resistance anemometer 114 illustrates an arrangement for detecting resistance changes across passive electrodes 82 and 84 of FIGS. 4 and 5, which is similar to a commercial conductivity probe. The hydro resistance anemometer 114 is designed to accomodate the sensor 80, depicted in FIGS. 4 and 5, although variations of this anemometer may be depicted to accomodate the other embodiments depicted in FIGS. 8 and 9.

The hydro resistance anemometer 114 includes a power supply 116 which provides a stable sinusoidal output on line 118 to a modulator and power amplifying circuit 120. The modulator and power amplying circuit 120 is coupled by an insulated line 122 to the central driving electrode 16 which has a terminal in a watertight metal housing 68. The driving electrode 16 is connected to the sensor 80, depicted as being immersed in an electrically conductive fluid body 124.

As a result of the current field set up in the vicinity of the passive sensing electrodes 82 and 84, a signal is produced on the sensing electrodes 82 and 84 which is directed to an alternating current amplifier 126. The velocity of fluid past the hemispherical surface 14 of the sensor 80 varies the output signal to the amplifier 126. Amplifier 126 is connected by insulated leads to another amplifier 128 to obtain the necessary signal gain. The amplifier 128 performs a comparison function similar to the summing amplifier 56 in the hydro resistance anemometer 12 depicted in FIG. 1. The output of the summing amplifier 128 is directed to a synchronous rectifier 130.

The synchronous rectifier 130 receives the alternating current carrier signal from the oscillator 116 and produces an output which is a full wave rectified sinusoidal signal on line 132. The oscillator 116 also provides a full wave rectified version of the sinusoidal signal on line 118 on another line 134. Lines 132 and 134 are connected to a loop dc amplifier and filter 136. The signals on lines 132 and 134 are beat against each other in synchronization so that the output of the loop dc amplifier and filter 136 is a direct current signal on line 138 which varies in accordance with the signals on the passive sensing electrodes 82 and 84. The signal on line 138 is used by the modulator and power amplifier circuit 120 to maintain a constant voltage between the passive electrodes 82 and 84. The output of the modulator and power amplifier circuit 120 therefore increases or decreases voltage applied on line 122 depending on the resistance in the fluid body 124 between passive electrodes 82 and 84.

Since the voltage output of the modulator and power amplifier circuit 120 is varied by the feedback input on line 138, the current output from the modulator and power amplifier circuit 120 also varies. The output of the modulator and power amplifier circuit 120 is directed to a synchronous rectifier 140. The output of the synchronous rectifier 140 is directed to an output filter and offset circuit 142 which also receives an input from the oscillator 116. The output of the hydro resistance anomometer 114 is a dc signal on line 144 which varies in accordance with the velocity of the fluid in the fluid body 124.

The primary difference between the hydro resistance anemometers 12 and 114 is that the anemometer 12 employs a constant carrier current from the oscillator 32 and produces a dc voltage on line 66 at the output of the summing amplifier 56 which varies in accordance with the effect of resistance 38 between the driving electrode 16 and the reference sheath 24. In the hydro resistance anemometer 114, on the other hand, changes in fluid velocity vary the signals on the passive sensing electrodes 82 and 84. These signals, in turn, effect an input on line 138 to the modulator and power amplifier circuit 120 to maintain a constant voltage differential between passive electrodes 82 and 84. The power output from the amplifier circuit 120 is thereby varied and variations in current are detected by the synchronous rectifier 140. The output on line 144 is thereby indicative of the fluid velocity in the fluid body 120.

Undoubtedly, numerous modifications of the invention will be readily apparent to those familiar with electrically operated anemometers. Accordingly, the scope of the invention should not be construed as limited to the specific embodiments of the invention depicted and described, but rather as defined in the claims appended hereto.

We claim:
1. A sensor for a hydro resistance anemometer comprising an encapsulating dielectric defining a blunt sensor end for disposition upstream toward a flowing fluid and having a hemispherical shape, a plurality of driving electrodes encapsulated in and laterally covered by said dielectric and having exposed tips uniformly located about the hemispherical surface of said blunt sensor end, and an electrically conductive reference electrode encircling said driving electrodes and bounding said hemispherical surface.

* * * * *